United States Patent
Hsuan et al.

(10) Patent No.: US 6,680,932 B1
(45) Date of Patent: Jan. 20, 2004

(54) FREQUENCY AND TIME SYNCHRONIZATION IN SEVERE DELAY SPREAD CHANNELS

(75) Inventors: Yi Hsuan, Whippany, NJ (US); Peter Thomas Monsen, Wellesley, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/523,363

(22) Filed: Mar. 10, 2000

(51) Int. Cl.[7] .................................................. H04J 3/06
(52) U.S. Cl. ....................... 370/350; 370/509; 370/516; 375/226; 375/362
(58) Field of Search .............................. 370/345, 350, 370/503, 509, 510, 511, 512, 516, 517, 518; 375/226, 326, 354, 362, 364, 366, 367, 371

(56) References Cited

U.S. PATENT DOCUMENTS 6,002,728 A * 12/1999 Blois et al. ................. 375/355
6,052,406 A * 4/2000 Epstein et al. .............. 375/134
6,052,423 A * 4/2000 Blois et al. ................. 375/355
6,366,629 B1 * 4/2002 Chen et al. ................. 375/355

* cited by examiner

*Primary Examiner*—Kenneth Vanderpuye
*Assistant Examiner*—Bob A. Phunkulh

(57) ABSTRACT

A method for synchronizing the time and frequency of an incoming packet of transmitted information with a receiver in a wireless communication system includes a synchronization method which may reduce the adverse effects of delay spread introduced by a bad channel. The method includes assigning a plurality of samples in a received synchronization segment of an incoming packet to corresponding bins, determining a number of phase test failures in each bin, and selecting the bin having the fewest number of phase test failures and the fewest number of small samples for synchronizing the time of the incoming packet with the receiver. Additionally, the method calculates the phase drift for the selected bin so that the frequency of the incoming packet is synchronized with that of the receiver.

18 Claims, 7 Drawing Sheets

FREQUENCY AND TIME SYNCHRONIZATION IN SEVERE DELAY SPREAD CHANNELS

BACKGROUND OF THE INVENTION

1. Field of the Invention

The present invention relates to the field of wireless communications, more particularly to synchronizer performance within a wireless modem.

2. Description of the Related Art

Explosive growth in the market for internet and intranet related applications has provided the impetus for a greater demand for fixed wireless networking services and systems. A wireless internet access system (WIAS) illustrated in FIG. 1 is composed; of four major parts: (a) multiple data base stations (BS) 100(*a*) and 100(*b*) which provide wireless connectivity and gain coverage to subscriber units 102(*a*)–(*d*) of a large geographical area (for example, residential and corporate terminal equipment as illustrated in FIG. 1); (*b*) wireless modems 170(*a*)–(*c*) (hereinafter "WM") which are connected to BS 100(*a*) or 100(*b*) via wireless links 115(*a*)–(*c*); (c) a data switching center (DSC) 125 with integrated management functions; and (d) a backbone transmission network 135 interconnecting (a)–(c) above.

As can be seen from FIG. 1, corporate terminals 102(*c*) and 102(*d*) can be, and many times are, connected to WM 170(*c*) via a local area network (LAN) and a wireless router or firewall (not shown). Additionally, BS 100(*a*) and 100(*b*) may communicate with DSC 125 via frame relays (not shown). Further in conventional wireless internet access systems or networks, DSC 125 is interconnected with backbone transmission network 135 by a router and/or firewall (not shown for clarity).

FIG. 2 illustrates BS 100(*a*) and 100(*b*) of FIG. 1 in an operational mode. Each BS 100(*a*) and 100(*b*) provides 360° RF coverage on the order of several gigahertz (preferably operating in the 3.5 GHz spectrum using approximately 5 MHz wide channels), sending and receiving signals over air lines 115(*a*)–(*c*) between individual subscriber units 102(*a*)–(*d*) served by BS 100(*a*) and/or 102(*b*). More particularly, the designated geographical area of subscribers served by each BS 100(*a*) and 100(*b*) is typically called a cell 150, defined by its coverage area as shown in FIG. 2, where BS 100(*a*) and 100(*b*) are situated in designated cells 150(*a*) and 150(*b*). Within each cell 150(*a*) or 150(*b*) reside a plurality of subscribers 102(*a*)–(*d*) served by the BS 100(*a*) and/or 100(*b*) includes a plurality of access points (hereinafter "AP", not shown in FIG. 1) serving as an interface between individual subscribers 102(*a*)–(*d*) of a cell 150(*a*)–(*b*) served by BS 100(*a*)–(*b*). Each access point includes receiver and transmitter circuitry of the base station for communicating with individual subscribers 102(*a*)–(*d*) within a designated cell 150(*a*)–(*b*).

Due to the need for increasing frequency spectrum reuse in the gigahertz band, in an effort to conserve this precious resource, the trend has been to reduce cell size even further (to microcells or picocells) which cover an even smaller geographical area, or which can serve hard to reach areas such as gullies and depressions where subscribers reside. Unfortunately this beneficial effect of increasing frequency spectrum reuse is offset by an increasing chance of neighboring cells interfering with each other, causing loss or degradation of the wireless signal. This loss or degradation of the wireless signal may be caused by, for example: (a) Rayleigh fading or delay spread due to multipath propagation; (b) shadow fading due to obstructions from natural and man-made objects around the main transmission path of the subscriber's devices; and (c) interference between co-channels and/or adjacent channels of wireless networks serving the subscriber's devices.

One particular problem related to (a) above could result from the development of signal delay spread in the wireless channel between a WM and an AP. A channel is the wireless link between a WM antenna and an AP antenna. A WM can function in at least five different frequency bands, but it only works in one frequency band, or one channel, at a time for receiving packets of information transmitted by an access point (AP), for example. Within the receiver circuitry of a WM is a synchronizer which perform an algorithm for time and frequency synchronization between received packet information and the receiver. The AP typically uses the same synchronizer algorithm as the WP. The synchronizer determines the starting time of an incoming packet and estimates the frequency offset between the transmitter of the AP and the receiver of the WM, so as to process the detected packet information.

A channel can go bad due to a variety of environmental conditions or changes, such as that due to traffic, temperature, rain, foliage, etc. For example, the terrain of a geographical area served by a wireless network can create multi-path delay spread of radio propagation. Multi-path delay spread in turn creates inter-symbol interference in the receiver detection circuitry, which ordinarily should be remedied by an equalizer component within the receiver. The equalizer, as well as the various components of a receiver are discussed further below.

For mobile systems, severe delay spread channels may be avoided by moving the mobile systems from place to place. However fixed wireless systems, employing a Time Division Multiple Access (TDMA) air interface for example, do not have the flexibility to be moved around in order to reduce the effects of severe delay spread channels. Thus the receivers within these fixed WMs need to be as robust as possible in order to handle delay spread channels and the effects thereof, which are discussed below.

A severe delay spread channel can usually be determined by examining the impulse response of the channel, or its $h(z)$ function. If the frequency response of $h(z)$ is relatively flat, the channel is a good channel in the sense that the inter-symbol interference is not so severe, or may be adequately handled by the equalizer within the receiver. However, if the frequency response exhibits a deep null, this is indicative of a bad channel, and the inter-symbol interference resulting from this spread will be difficult to equalize. For example, a bad channel could develop if the receiver is receiving from more than one strong signal source, and these two signal sources are separated by some time delay longer than "one symbol" time due to the multi-path effect described above.

To understand how the current synchronizer works, and also to comprehend the effects of delay spread on modem performance, the following terms are defined. Each detected packet is divided into segments allocated to various components within the receiver. The synchronizer segment of an incoming packet contains 17 symbols. There are eight time samples per symbol allocated in the synchronizer segment. A bin is a storage location for storing a corresponding one of the eight samples for each sequentially processed symbol; thus there are eight bins in the synchronizer, bins $b_1$ to $b_8$.

The synchronizer first wants to determine if there is any differential phase error (DFE) test failure in each bin. Because these 17 transmitted sync symbols are always known to the receiver beforehand, the receiver compares the phases of the received samples in a certain bin with the phases of those known sync symbols. Suppose that the phases of sync symbols are $\angle x(1)$, $\angle x(2)$, ..., $\angle x(17)$. The receiver checks if bin 1 has a DFE test failure by first looking at the difference between $|\angle x(1)-\angle x(2)|$ and $|\angle s1-\angle s9|$. This difference is called DFE. If the absolute value of DFE is larger than 90°, a DFE test failure occurs. Next the receiver checks the difference between $|\angle x(2)-\angle x(3)|$ and $|\angle s9-\angle s17|$, and so on. If all 16 DFEs are <90°, then bin 1 does not have a DFE test failure.

In the current algorithm, the synchronizer chooses a bin location only if the bin does not contain any failure of the differential phase error test. If all bins have phase test failures, the synchronizer fails and the received packet is "thrown away". This means that it is as if the receiver never received the transmitted packet; since the synchronizer has failed, none of the follow on processes in the receiver are performed and the packet must be re-transmitted.

Under severe delay spread channels, there is a good likeliness that all bins will have DFE test failure(s). Therefore, a problem with the current method of synchronizer operation is that it is too sensitive in regard to possible severe delay spread channels. What is desired is an algorithm that allows continued performance of the synchronizer despite the presence of delay spread channels, in order to maintain communication connectivity with an access point (AP) in a wireless network serving subscribers, for example.

FIGS. 3a and 3b illustrate a signal amplitude for a channel which is not subject to delay spread and a channel which is subject to the influence of delay spread. Referring to FIG. 3a, there is illustrated a signal amplitude of I/Q real and imaginary parts of the signal), a channel that does not introduce any delay spread. The circles represent the I signals and the squares represent the Q signals. These signals represent the actual seventeen synchronization symbols processed in a synchronizer of a WM or an AP, where I and Q are always the same value (both either +1 or −1).

However, as illustrated in FIG. 3b, the same set of symbols are not matched under the influence of a delay spread model. The channel response for FIG. 3(b) is defined as:

$$h(z)=0.707+0.707*e^{j\pi/2}z^{-1}$$

In this delay spread model, $z^{-1}$ is indicative of a one symbol time delay, and $e^{j\pi/2}$ represents that a transmitted symbol is rotated clockwise by 90 degrees on the complex plane. For example, and given the impulse response, if an AP transmitter transmits signals s1, s2, s3, etc., the WM receiver sees 0.707(s2+is1), 0.707(s3+is2), etc.

Thus in FIG. 3(b), the received I and Q signals are completely out of phase. This out of phase characteristic is obviously disadvantageous, given the current bright line test regarding differential phase error test failures in the synchronizer. Specifically, if each bin contains a failure (in this case each bin would have a differential phase test error failure) the synchronizer fails in toto. This in turn causes the receiver to discard the rest of the packet and the transmitter has to retransmit the same packet again. Thus, overall system data throughput suffers from this iteration. Therefore what is needed is a more robust frequency/time synchronization algorithm which is less sensitive to these delay spread effects of bad channels.

SUMMARY OF THE INVENTION

The present invention provides a method for synchronizing a transmitted packet with a receiver in a wireless communication system. The method includes assigning a plurality of samples in a received synchronization segment of an incoming packet to corresponding bins, determining a number of phase test failures in each bin and selecting a bin having the fewest number of phase test failures for synchronizing the time of the incoming packet with the receiver. Additionally, the phase drift is calculated for the selected bin so that the frequency of the incoming packet is synchronized with that of the receiver.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

The present invention provides a method for synchronizing time and frequency of an incoming packet with a receiver in a wireless system so as to reduce the probability of a bad channel causing a failure of its corresponding wireless component. Specifically, an algorithm within the receiver of a wireless network or system component such as a wireless modem (WM) synchronizes time and frequency of each incoming packet transmitted from an access point (AP), for example, with the receiver of the WM. Thus, any delay spread effects are accounted for providing a robust receiver that maintains communication connectivity even when channels are influenced by geographic and/or environmental constraints that promote the development of bad channel(s).

Both a wireless modem (WM) and an access point (AP) within a wireless communication network in accordance with the present application have radio units with receiver and transmitter circuitry, each providing for respective transmit and receive functions. An uplink signal transmitted from WM to AP can operate in a 1 MHz RF channel between approximately 3450–3500 MHz, whereas a downlink signal transmitted from AP to WM preferably occupies a 1 MHz RF channel between approximately 3550–3600 MHz. Further, both radio units have an automatic gain control (AGC) function to provide linear demodulation over a wide dynamic range; a receive signal strength indication (RSSI) function to enable digital control of the AGC; and both radio units perform quadrature phase shift keying (QPSK) modulation and demodulation, as well as quadrature amplitude modulation (QAM).

Figure 4:
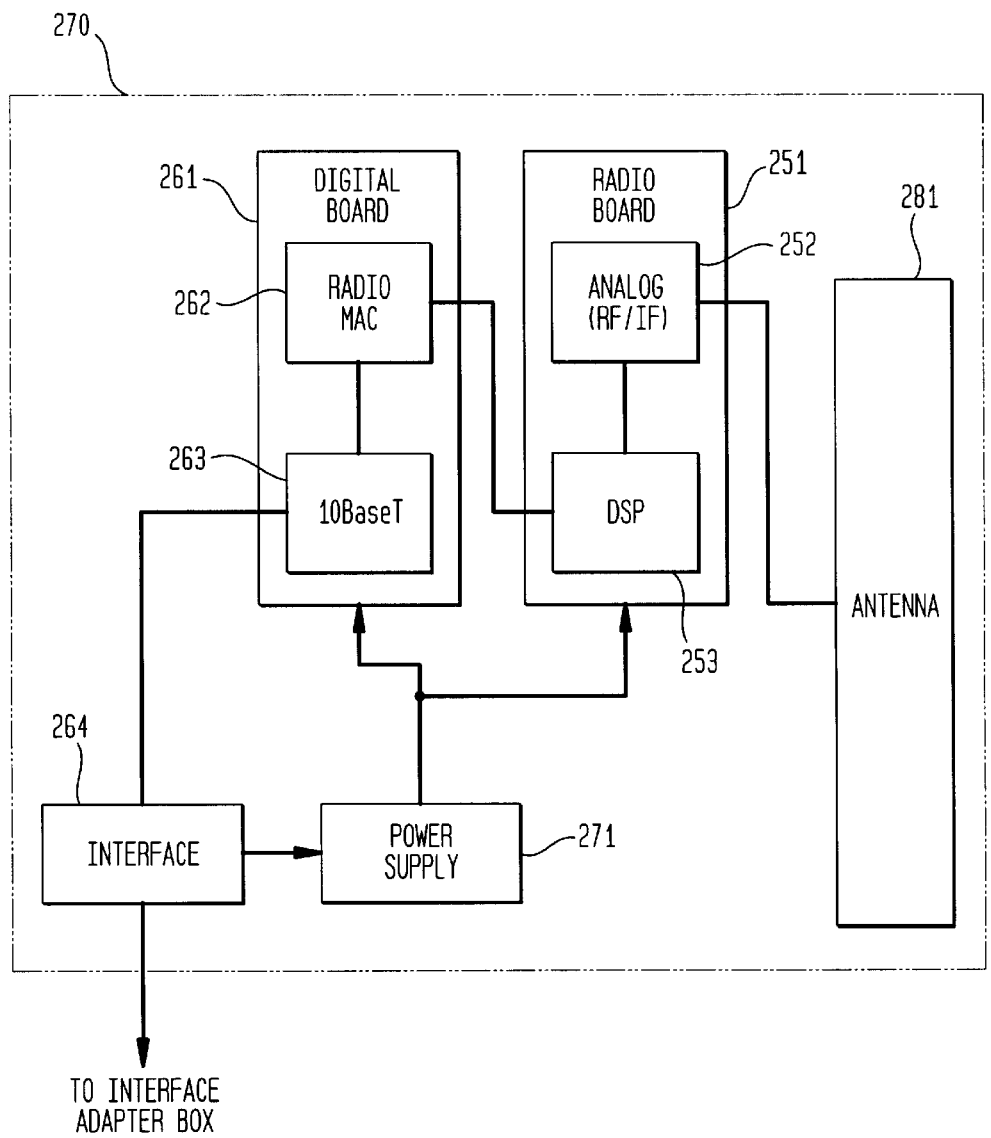
FIG. 4 depicts a wireless modem block diagram in accordance with the present application.

FIG. 4 depicts a block diagram of the architecture of a WM 270 in accordance with the preferred embodiment. Radio board 251 converts RF signals received from an AP via a WM antenna 281 to digital signals, and vice-versa. WM antenna 281 can be a vertically polarized, 16 element (4×4) raised patch slot fed array designed to operate at a center frequency of 3.5 GHz, which provides for approximately 18 dBi of gain with a 3 dB beamwidth at approximately 18° in the azimuth and elevation planes respectively. The received RF signals are downconverted to baseband I/Q signals through a two-stage heterodyne conversion at 252. Digital Signal Processor (DSP) 253 performs the QPSK modulation/demodulation of the baseband I/Q signals, which are further processed at a digital board 261.

Digital board 261 provides medium access control (MAC) and protocol functions at 262 to ensure that only a single WM is communicating with an AP at any given time through scheduling of data transmission and traffic management. Digital board 261 also performs conversion of a proprietary MAC data format to standard 10Base-T data streams at 263 for connection to subscriber end user 290 (not shown) via interface 264. Power supply 271 preferably supplies WM 270 with 24 V DC, and preferably supplies 7 VDC to power radio board 251 and digital board 261.

Figure 5:
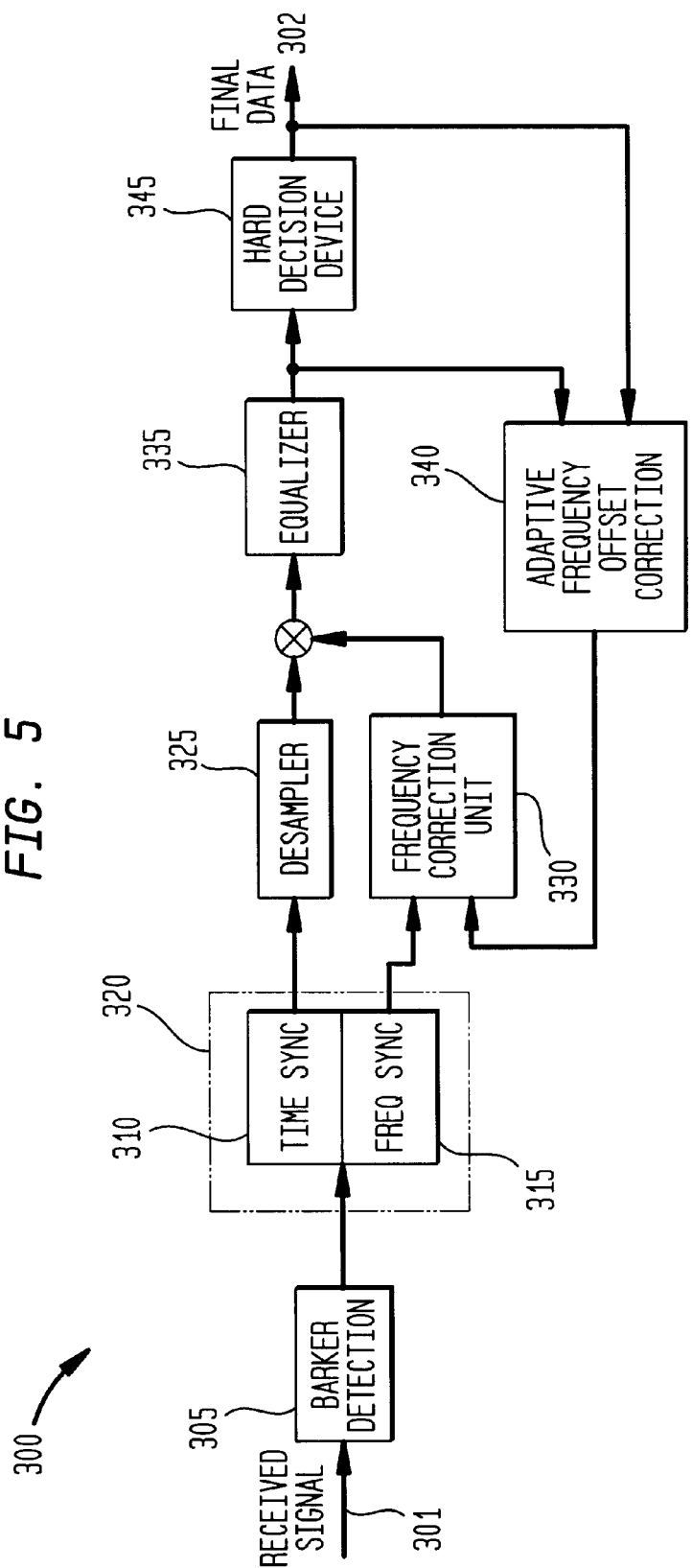
FIG. 5 depicts receiver circuitry block diagram for a wireless modem in accordance with the present application.

FIG. 5 illustrates a block diagram of a receiver for a wireless modem in accordance with the present application. Specifically, there is illustrated a baseband receiver 300 of WM 270, which is located in the DSP 253 of the radio board of the WM 270 block diagram of FIG. 4, for example. Receiver 300 is comprised of a Barker detection circuit 305, a synchronizer 320, a desampler 325, a frequency correction unit (FCU) 330, an equalizer 340, an adaptive frequency offset correction unit (AFOC) 335 and a hard decision device (HDD) 345. Additionally, synchronizer 320 is further comprised of a time synchronization portion 310 and a frequency synchronization portion 315.

Referring to FIG. 5, after received signals 301 pass through antenna 281, and undergo 2-stage heterodyne conversion at analog converter 252 (not shown in FIG. 5 for clarity), the received signals 301 are initially over-sampled to eight (8) samples per symbol. Barker detection circuit 305 functions as a signal detection/coarse time synchronization unit. Barker detection circuit 305 tells the receiver 300 whether or not there is a packet coming in. Additionally, Barker detection circuit 305 also provides an estimated starting time for the incoming packet. This rough (coarse adjusted) time synchronization is refined in time synchronization portion 310, to attain an exact (fine adjusted) time synchronization. This fine-adjusted time synchronization is output to desampler 325, which uses the time sync to down-sample the data flow from 8 samples/symbol to one (1) sample/symbol. The output of desampler 325 is fed to equalizer 335, which processes one sample per symbol to combat inter-symbol interference. Equalizer 335 takes several incoming symbols and combines them so as to remove the effect of inter-symbol interference introduced by the channel. For a further discussion of the equalizer, see co-pending U.S. patent application Ser. No. 09/522,706, entitled "METHOD OF CORRECTING FREQUENCY ERRORS FOR COHERENTLY DEMODULATED WIRELESS COMMUNICATION SYSTEMS"pending, filed concurrently with the present application. The output of equalizer 335 is a complex data stream which is input into HDD 345, which maps each incoming complex number to the closest QPSK symbol on the complex number plane. The output of HDD is then fed to a decoder (not shown) which converts complex symbols to zeros and ones.

In another branch of receiver 300, FCU 330 adjusts the baseband receiver's oscillator (not shown) to minimize the frequency offset between the receiver and the transmitter's oscillator (of the AP for example. This frequency offset causes a constant phase drift between two symbols, which can result in significant performance degradation. For example, if frequency offset causes 1 degree phase drift per symbol, symbols would be nearly 180 degrees off the correct phase after 180 symbols had passed through the receiver 200. FCU 330 receives inputs from frequency synchronization unit 315 and AFOC unit 340, and then calculates the per-symbol phase drift, or "pd", which is initially set to zero.

All time samples output from desampler 325 are rotated based on the phase drift value, more particularly on a per-symbol phase drift value. For instance, if the symbols output and rotated from desampler 325 are s1, s2, s3, etc., and the per-symbol phase drift is +x degrees, s1, s2 and s3 will be rotated by −x, −2x, −3x degrees, etc., respectively on the complex number plane. Although each symbol is rotated by a different angle, the phase drift between two adjacent symbols (which is the definition of per-symbol phase drift) is always x. Moreover, the per-symbol phase drift value may change as the input from the AFOC unit 340 changes.

Packet error rate (PER) is defined as the probability that a transmitted packet cannot be received correctly by the receiver. As previously discussed, the synchronizer 320 in the current modem implementation chooses a bin location only if the bin contains no differential phase error test failures. The synchronizer 320 is most sensitive to the effects of bad channels (i.e., if all bins have a differential phase error test failure for a detected packet of information, the synchronizer and hence the WM fails for that packet. In other words, the receiver rejects the packet as if it was never transmitted, requiring the transmitter to re-transmit the rejected packet. Further, PER generally decreases with increasing signal-to-noise ratio (SNR). What is desired is a synchronization method which may attain a PER as low as possible for a given SNR, i.e., a method which will allow continued communications (fewer or no rejected transmitted packets), even for channels that exhibit severe delay spread.

Therefore, to reduce packet error rate and receiver sensitivity and thereby promote robustness in the synchronizer, two algorithms have been developed. Algorithm S1 is defined by the following equation:

$k = \text{mini } PTF(i)$, and $MEO(k) \geq MEO(j)$ for all $j$ if $PTF(k)=PTF(j)$; (1)

where, $pd = APE(k)/16$. (2)

In the S1 algorithm above, PTF(i) is the number of phase test failures in bin (i); MEO(i) is the minimum eye opening of bin (i); k is the bin number chosen by the synchronizer, that being the bin (one of $b_1$ to $b_8$, for example) having the fewest number ($\text{min}_i$) of PTF(i); pd is the per-symbol phase drift calculated by synchronizer 320, with APE(k) defined as the accumulated phase error in the chosen bin k, i.e., the sum of all differential phase errors in bin k. As will be explained later, in the event two or more bins (i.e., a bin $j=b_1, b_2$, etc.) have an equal number of fewest PTF(i), a comparison of MEO(j) for each of the bins having the fewest PTF(i) is performed to select the desired bin k.

The receiver 300 doesn't know the exact starting time of a transmitted packet it receives. Thus, time synchronization is needed to inform receiver 300 of the stating time of an incoming packet. More particularly, this is the exact (fine adjusted) starting time of the first synchronizer segment symbol of the 17 symbols of an incoming packet which are designated for synchronizer 320. Once the exact starting time of this first symbol is determined in time synchronization portion 310, then the remaining 16 symbols of the synchronizer segment are in time sync with synchronizer 320. Hence, the incoming packet is in time sync with receiver 300.

Moreover, synchronizer 320 (and hence receiver 300) also wants to be in frequency synchronization with a transmitted packet. This is not possible, however, because the receiver 300 and transmitter (in an AP, for example) each have oscillators with differing frequencies. Thus, frequency synchronization portion 315 in synchronizer will calculate the per-symbol phase drift (pd) and output pd to FCU 330 so as to compensate for this inherent frequency offset.

Each bin is a storage location for time samples, each bin corresponding to a time location. In synchronizer 320, there are eight bin locations, $b_1$ to $b_8$. Recall that in each detected packet, there are seventeen (17) symbols allocated in the synchronizer segment of each detected packet, each symbol having 8 samples. For example, if the incoming samples of the synchronization segment are numbered by s1, s2, s3, . . . , s135 and s136 (136 samples or 17 symbols), bin 1 stores s1, s9, s17, . . . , s129 and bin 8 stores s8, s16, . . . , s136. The time synchronizer portion 310 of synchronizer 320 will determine the minimum magnitude of all samples in each of the bins (i.e., the minimum eye opening, or MEO).

The desampler 325 is designed to select only one out of the eight samples, and to discard the rest of the seven samples. The "k" value informs desampler 325 as to which sample to select. For example, if a sequence of samples are s1, s2, s3 . . . and if k=2, the output of the desampler 325 is s2, s10, s18, . . . etc. The estimation of the frequency offset value between a transmitter and the receiver 300 is the phase drift calculation, or pd. Depending on the channel condition, the receiver 300 can calculate different estimation results.

The implementation of the S1 algorithm is as follows. Utilizing equation (1) for k, the time synchronization portion 310 checks in each bin to find the bin that has the lowest number of PTF(i). Recall the example where the phases of sync symbols are $\angle x(1)$, $\angle x(2)$, . . . , $\angle x(17)$. Time synchronization portion 310 checks if bin 1 has a PTF(i) (a differential phase error test failure) by first looking at the difference between "$\angle x(1)-\angle x(2)|$ and $|\angle s1-\angle s9|$. If the absolute value of the differential phase error is greater than 90°, a PTF(i) occurs. Next time synchronization portion 310 checks the difference between $|\angle x(2)-\angle x(3)|$ and $|\angle s9-\angle s17|$, and so on. If all 16 differential phase errors, or DFEs are <90°, then bin 1 does not have a PTF(i).

Thus, the bin that has the fewest PTF(i) is chosen bin number k for providing the time synchronization for receiver 300, i.e. the aforementioned exact staring time of the incoming packet. However, if two or more bins have the same number of fewest PTF(i), the next iteration is to compare MEO for these bins. Thus, since time synchronizer portion 310 has determined MEO for all the bins, the bin index with the highest MEO is chosen as k, which is the output of time synchronization portion 310 in FIG. 5.

Equation (2) of the S1 algorithm, the calculation of pd, is performed in frequency synchronization portion 315. Frequency synchronization portion 315 calculates the accumulated phase error (APE(k)) in the chosen bin k, and divides it by the number of phase changes between time symbol 1 and time symbol 17 in the synchronization segment of the detected packet (there are sixteen phase changes between the first and last symbol of the synchronization segment) to determine the per-symbol phase drift. This pd value is thereupon output to FCU 330, as previously described, to compensate for frequency oscillation differences (offset) between the oscillator in the receiver 300 of the WM 270, and a transmitter in the AP, for example. Thus, the output of time synchronization portion 310 is k, and the output of frequency synchronization portion 315 is pd. Accordingly, by eliminating the possibility of synchronizer failure, the S1 algorithm is an improvement over the current method of choosing a bin location for time and frequency synchronization.

The S1 algorithm still does not account for problems inherent in receiving small amplitude samples, however. For example, if a transmitted sample is 10+10j (one of the QPSK symbols), the others would be −10+10j, −10−10j and 10−10j. Take the case where the corresponding time sample received by receiver 300 is 9+9j. Although receiver 300 does not know what the actual transmitted symbol is, it assumes that 10+10j is the transmitted symbol, because it takes a substantial amount of additional noise energy (i.e., 19 dB) to make a −10 become a +9. If the sample amplitude is small (i.e., 1+1j is the received sample), then it takes less noise energy (i.e., 11 dB) to make a −10 become a +1.

Therefore although the receiver 300 still assumes that 10+10j is the transmitted symbol, it is more likely that the transmitted symbol is 10+10j, in this example. Thus, decision made by receiver 300 has a larger probability of error. Further, if this unreliable sample is used to estimate frequency offset, a 90° error (from 10−10j to 1+1j) may occur in the differential phase error calculation. This in turn results in inaccurate accumulative phase error (APE) and inaccurate pd, and would therefore deteriorate estimation accuracy as shown in equation (2) above.

Accordingly, a second algorithm S2 has been developed, based on the fact that small amplitude (magnitude) samples may often result in inaccurate phase drift measurements. The S2 algorithm is defined by the following equations:

$$K=\min_i (PTF(i)+NC2(i)) \text{ and} \qquad (3)$$

$$MEO(k) \geq MEO(j) \text{ for all } j, \text{ if } PTF(k)+NC2(k) \, PTF(j)+NC2 \, (j);$$

$$\text{where, } pd=APE_1(k)/[16-NC2(k)]. \qquad (4)$$

The basis behind the S2 algorithm is that small samples should be excluded from the phase drift calculation pd. As discussed above, small samples are more likely to possess inaccurate phase information, which could adversely affect the accuracy of two sequential differential phase error calculations. Inaccurate pd very often causes severe performance degradation.

The S2 algorithm distinguishes the time samples of a bin into two categories, by their magnitudes. Suppose symbols of unit magnitude are used in the equalizer 335 for reference signals and for generating equalization errors. Suppose 1.0 is the standard magnitude, and 0.3 is the value used to distinguish the samples into the two categories of the S2 algorithm. More specifically, samples with magnitudes larger than 0.3 belong in a category (1), and those samples having a magnitude less than or equal to 0.3 belong in category (2). Equation (3) is somewhat similar to equation (1) above for the S1 algorithm; however it adds an additional term, NC2(i). NC2(i) is the number of samples in bin i that are a category (2), i.e., that category where samples have a magnitude s 0.3. Thus, the chosen k is that bin having the fewest number of PTF(i), plus the fewest number of samples with category (2) amplitudes.

Similar to equation (1), if two or more bins are "tied" having the fewest number of PTF(i) and also the fewest number of category (2) samples, the MEO(j) of the bins are compared, wherein the k chosen by the time synchronization portion 310 is the bin which has the largest MEO, given that the number of PTF(i) and the NC2(i) samples are equal in the respective bin.

Equation (4) is also somewhat similar to pd equation (2) of the S1 algorithm. However, phase drift (pd) in equation (4) is calculated by determining the accumulated phase error $APE_1(k)$ for the chosen bin and dividing it by 16 minus the number of samples in the chosen bin k that are in category (2). More specifically, the accumulated phase error $APE_1$ is the accumulated phase error calculated only from those category (1) samples in chosen bin k, or samples having a magnitude greater than 0.3. Thus, the S2 algorithm accounts for small sample amplitudes by including NC2(i) in the minimization process to select a bin k. Once a bin is selected, the phase drift resulting from small samples are excluded in the per-symbol phase drift calculation pd.

Figure 6:
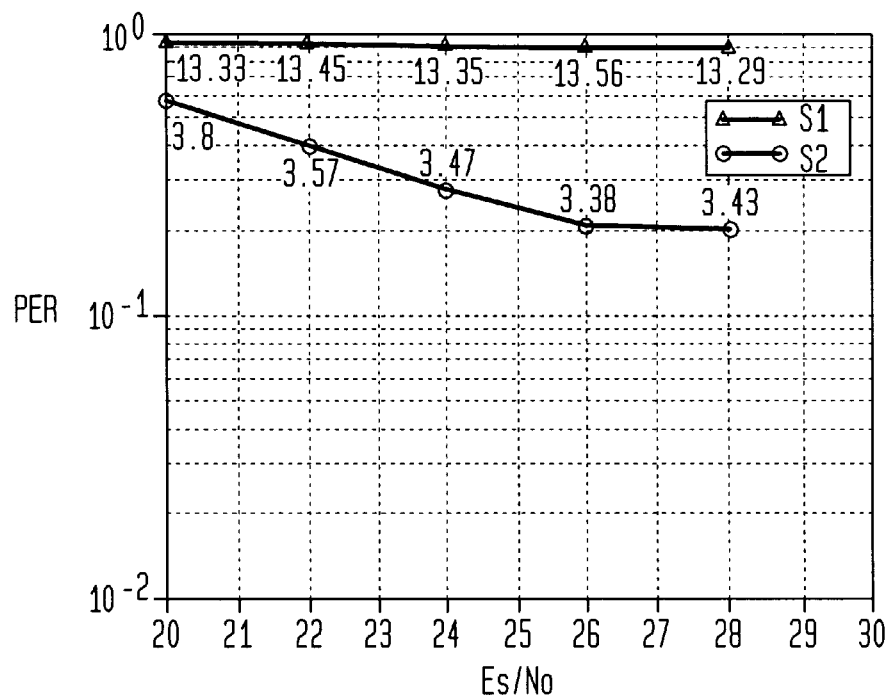
FIG. 6 illustrates the channel impulse response and packet error rate in a first two-ray delay spread profile.
Figure 7:
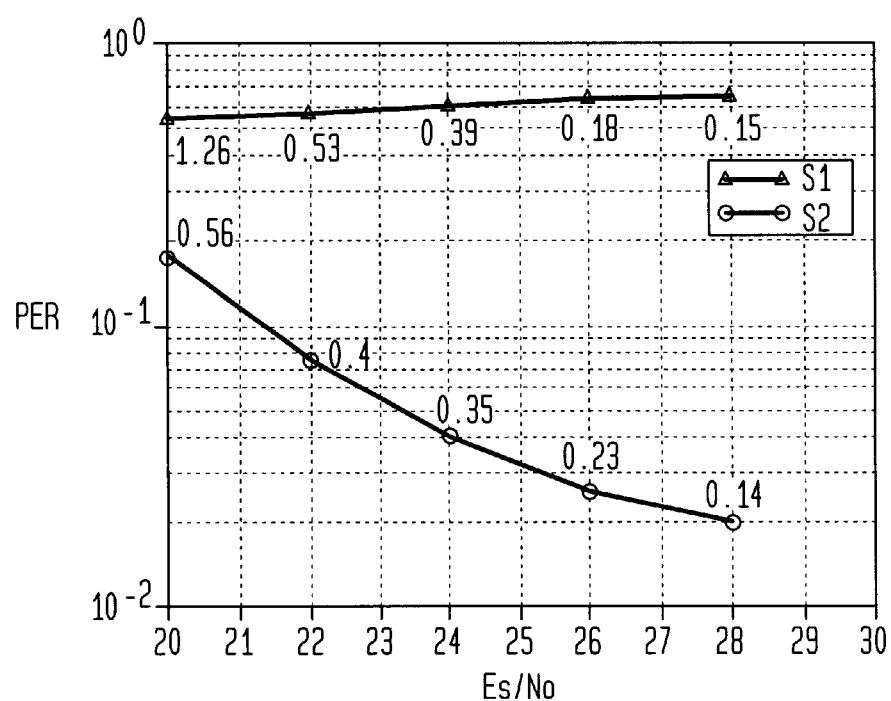
FIG. 7 illustrates channel impulse response and packet error rates in a second two-ray delay spread profile.
Figure 8:
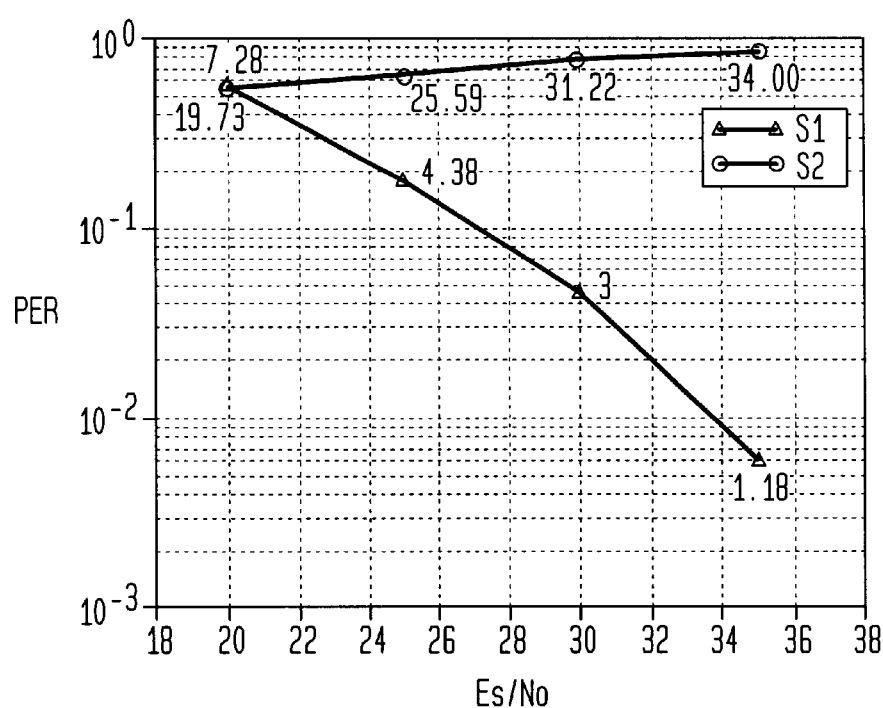
FIG. 8 illustrates channel impulse response and packet error rates for a three-ray delay spread profile.

FIGS. 6–8 illustrate packet error rates (PER) for both the S1 and S2 algorithms for various channel conditions. In each simulation, a fixed output from Barker checking circuit 305 was assumed. Modem crystals were set to be randomly distributed between ±10 ppm. Each of the channels examined were channels that tended to cause the synchronizer 320 to fail most of the time, i.e., all PTF(i)s were not equal to 0.

The channel impulse responses h(z) are also shown in FIGS. 6–8. The number near each point on the figures represents the resulting root mean square (RMS) values of the frequency estimates. In each of FIGS. 6–8, Es/No is signal-to-noise ratio (SNR). On the y-axis is packet error rate (PER), which as discussed earlier is the probability that a transmitted packet cannot be received correctly by the receiver. Additionally, simulation for each channel response in FIGS. 6–8 was performed with an iteration of 10,000 packets.

FIG. 6 illustrates the packet error rates in a first 2-ray delay spread profile. The 2-ray delay spread profile has a channel impulse response $h(z)=0.707(1-z^{-1})$, $z^{-1}$ indicating a one-symbol time delay. In FIG. 6, the S2 algorithm (RMS values indicated by a "o") results in a lower RMS than the S1 algorithm (RMS values indicated by a "Δ"), and therefore lower PER. For example, at an Es/No value 24, the S1 algorithm in delay spread profile depicts a packet error rate of about 90%, whereas the S2 algorithm indicates a PER of about 28%.

Figure 1:
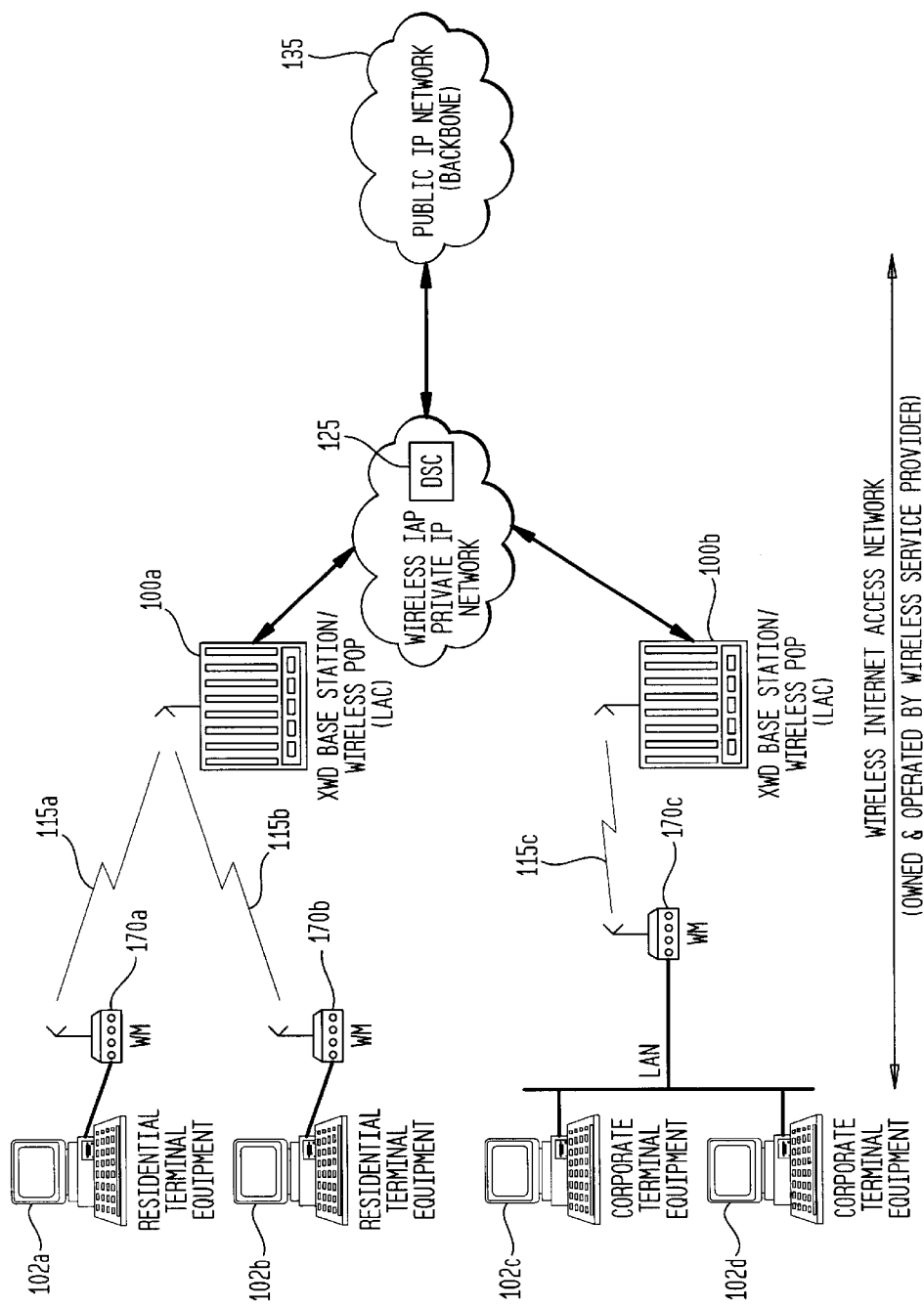
FIG. 1 illustrates a wireless internet access system in accordance with the present application.
Figure 2:
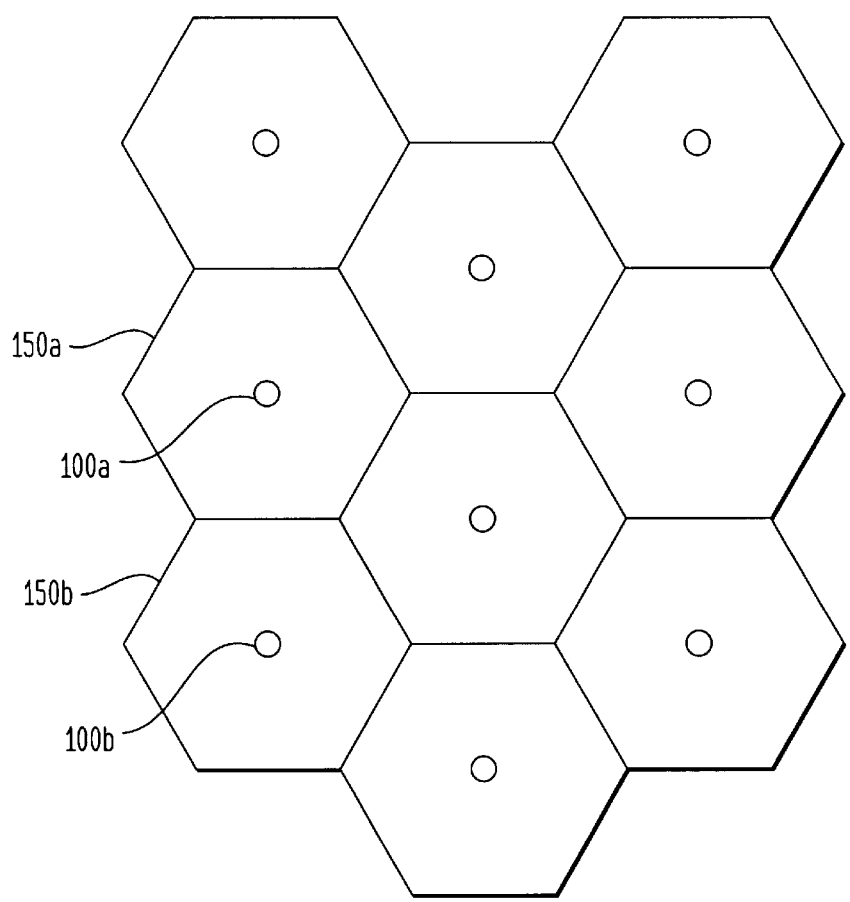
FIG. 2 illustrates the base stations of FIG. 1 in an operational mode.
Figure 3A:
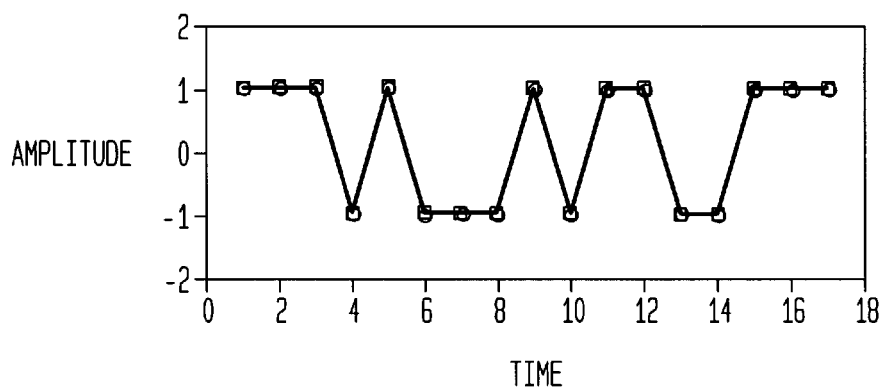
FIG. 3a illustrates signal amplitude for a channel which exhibits no delay spread.
Figure 3B:
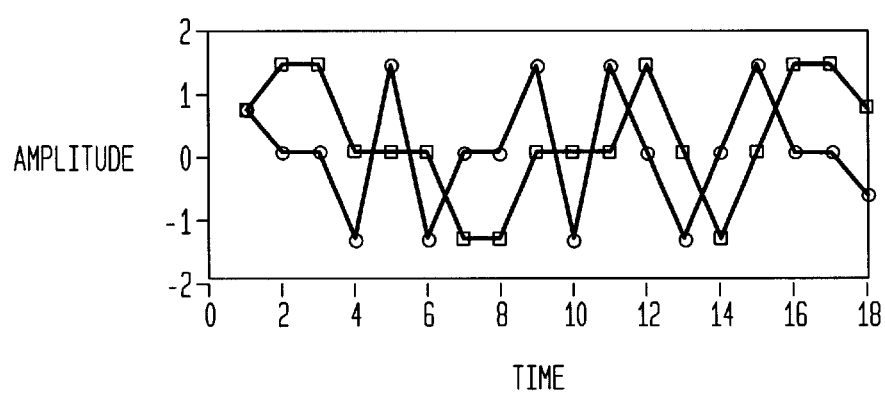
FIG. 3b illustrates the signal amplitude of the a channel influenced by delay spread.

FIG. 7 illustrates the comparison of the S1 and S2 algorithms for a second 2-ray delay spread profile having a channel impulse response of $h(z)=0.707+0.707e^{j\pi/2}*z^{-1}$ (one time symbol delay and a 90 degree phase shift from the transmitted signal. This is the same channel impulse response used to illustrate the problems with delay spread in FIG. 3(b). Although the S1 and S2 algorithms have similar performance in terms of RMS of the frequency estimates, the PER performance of S2 is much improved over that of S1. This is especially noticeable at an Es/No value of 28, where S2 exhibits a packet error rate of about 1%, versus the S1 algorithm's PER of approximately 65%. Most notably, each algorithm is a marked improvement over the current modem implementation, which exhibits a 100% PER.

FIG. 8 illustrates packet error rates for a particular channel, in this case a 3-ray channel. The impulse response for this channel is given by $h(z)=0.408+0.816z^{-1}+0.408z^{-2}$ (two-symbol time delay). Somewhat similar to FIG. 6, the S2 algorithm results in a much lower RMS value of the frequency estimate as well as a much lower packet error rate, as compared to that attainable with use of the S1 algorithm. Moreover, each of FIGS. 6–8 illustrate the improvement of both the S1 and S2 algorithms over the current method used by the synchronizer to choose a bin location, which causes the synchronizer to fail and to reject transmitted packets if each of the bins has phase test failures.

Therefore, the present invention provides a method for synchronizing time and frequency of a transmitted packet with the receiver so as to account for the influences of severe delay spread channels. With the use of algorithms S1 and S2, synchronizer performance within a receiver is improved in terms of being less sensitive to the effects of delay spread. Thus synchronizer and modem operation may be maintained even when the modem is situated in geographical areas that exhibit traffic, rough terrain, gullies, depressions, etc. Moreover, the algorithms enable receivers to be as robust as possible in handling severe delay spread channels in a wireless communication network.

The invention being thus described, it will be obvious that the same may be varied in many ways. For example, although the invention has been described with regard to a receiver in a wireless modem, the S1 and S2 algorithms may also be used in access point receiver circuitry. Additionally, although the invention has been described with respect to TDMA systems, these algorithms may be used in GSM mobile systems and/or any other fixed wireless systems that are based on time division multiplexing.

Further, although the above described receiver has been described as comprised of several components or blocks, it should be understood that the synchronization algorithm can be implemented in application specific integrated circuits, software-driven processor circuitry, or other arrangements of discrete components. Such variations are not to be regarded as a departure from the spirit and scope of the invention, and all such modifications as would be obvious to one skilled in the art are intended to be included within the scope of the following claims.

What is claimed is:

1. A method of synchronizing a transmitted packet with a receiver in a wireless communication system, comprising:

assigning a plurality of samples in a received synchronization segment of an incoming packet to corresponding bins;

determining the number of phase test failures in each bin; and selecting the bin having the fewest number of phase test failures for synchronizing the time and frequency of the incoming packet with the receiver.

2. The method of claim 1, wherein per-symbol phase drift of said selected bin is determined for synchronizing the frequency of the incoming packet with the receiver.

3. The method of claim 2, wherein, if more than one bin has an equal number of fewest phase test failures, the bin selected for time and frequency synchronization is that bin out of those having the fewest number of phase test failures which has the largest minimum eye opening.

4. The method of claim 3, wherein the minimum eye opening is the amplitude of a sample stored in a corresponding bin.

5. The method of claim 2, wherein said step of selecting a bin is defined by the equations:

$k = \min_i PTF(i)$, and $MEO(k) \geq MEO(j)$ for all $j$ if $PTF(k) = PTF(j)$;

wherein k is the selected bin(i), i=1 to 8, PTF(i) is the number of phase test failures for a one of bin(i), and MEO(k) is the largest minimum eye opening for all bins j having an equal number of fewest phase test failures.

6. The method of claim 5, wherein per-symbol phase drift (pd) for said selected bin k is defined by:

$$pd = APE(k)/16;$$

wherein APE(k) is the accumulated phase error in the selected bin k.

7. The method of claim 1, wherein small samples are excluded from said time and frequency synchronization, and wherein a small sample is defined as a category (2) time sample having an amplitude <0.3.

8. The method of claim 7, wherein said step of selecting a bin is defined by the equations:

$$k = \min_i (PTF(i) + NC2(i)), \text{ and}$$

$$MEO(k) \geq MEO(j) \text{ for all } j \text{ if } PTF(k) + NC2(i) = PTF(j) + NC2(j);$$

wherein k is the selected bin(i), i=1 to 8, PTF(i)+NC2(i) is the number of phase test failures for a bin(i) plus the number of time samples in a bin(i) that are of category (2), and MEO(k) is the largest minimum eye opening for all bins j having an equal number of fewest phase test failures and category (2) time samples.

9. The method of claim 8, further comprising determining per-symbol phase drift (pd) of said selected bin k for synchronizing frequency of the incoming packet with the receiver, wherein said step of determining is defined by the equation:

$$pd = APE_1(k)/[16 - NC2(k)];$$

wherein $APE_1(k)$ is the accumulated phase error in the selected bin k for category (1) time samples, that is, those time samples in the selected bin k having an amplitude >0.3.

10. A synchronizer for use in a receiver of a wireless communication system, comprising:
   a time synchronizing unit configured to assign a plurality of samples of an incoming packet to corresponding bins, to determine a number of phase test failures in each bin, and to select the bin having the fewest number of phase test failures for synchronizing time of the incoming packet with the receiver; and
   a frequency synchronizing unit for synchronizing the frequency of the incoming transmitted packet of information with that of the receiver.

11. The synchronizer of claim 10, wherein said frequency synchronizing unit is configured to calculate per-symbol phase drift of the selected bin for synchronizing frequency of the incoming packet with the receiver.

12. The synchronizer of claim 10, wherein, in the case where more than one bin has an equal number of fewest phase test failures, the time synchronizing unit checks the minimum eye opening of each bin, selecting that bin having the largest minimum eye opening as the selected bin for time and frequency synchronization.

13. The synchronizer of claim 12, wherein the minimum eye opening is the amplitude of a sample stored in a corresponding bin.

14. The synchronizer of claim 10, wherein the time synchronizing unit selects the bin (k) for time synchronization, and wherein $$k = \min_i PTF(i), \text{ and}$$

$$MEO(k) \geq MEO(j) \text{ for all } j \text{ if } PTF(k) PTF(j),$$

wherein k is the selected bin(i), i=1 to 8, PTF(i) is the number of phase test failures for a one of bin(i), and MEO(k) is the largest minimum eye opening for all bins j having an equal number of fewest phase test failures.

15. The synchronizer of claim 14, wherein the frequency synchronizing unit calculates per-symbol phase drift (pd), wherein $$pd = APE(k)/16, \text{ and}$$

wherein APE(k) is the accumulated phase error in the selected bin k.

16. The synchronizer of claim 10, wherein small samples of the incoming packet are not processed by the time and frequency synchronization units, a small sample defined as a category (2) time sample having an amplitude <0.3.

17. The synchronizer of claim 16, wherein the time synchronizing unit selects bin k for time synchronization, and wherein $$k = \min_i (PTF(i) + NC2(i)), \text{ and}$$

$$MEO(k) \geq MEO(j) \text{ for all } j \text{ if } PTF(k) + NC2(i) \, PTF(j) + NC2(j),$$

wherein k is the selected bin(i), i=1 to 8, PTF(i)+NC2(i) is the number of phase test failures for a bin(i) plus the number of time samples in a bin(i) that are of category (2), and MEO(k) is the largest minimum eye opening for all bins j having an equal number of fewest phase test failures and category (2) time samples.

18. The synchronizer of claim 17, wherein the frequency synchronizing unit determines per-symbol phase drift (pd) for synchronizing frequency of the incoming packet with the receiver by $$pd = APE_1(k)/[16 - NC2(k)],$$

wherein $APE_1(k)$ is the accumulated phase error in the selected bin k for category (1) time samples, that is, those time samples in the selected bin k having an amplitude >0.3.

* * * * *